(12) United States Patent
Goss et al.

(10) Patent No.: US 11,874,181 B2
(45) Date of Patent: Jan. 16, 2024

(54) SENSOR LINE AND MEASURING ASSEMBLY

(71) Applicant: LEONI KABEL GMBH, Roth (DE)

(72) Inventors: Sebastian Goss, Roth (DE); Sergey Intelman, Fuerth (DE); Joerg Wenzel, Roth (DE)

(73) Assignee: LEONI Kabel GmbH, Roth (DE)

( * ) Notice: Subject to any disclaimer, the term of this patent is extended or adjusted under 35 U.S.C. 154(b) by 673 days.

(21) Appl. No.: 16/980,516

(22) PCT Filed: Mar. 13, 2019

(86) PCT No.: PCT/DE2019/100223
§ 371 (c)(1),
(2) Date: Sep. 14, 2020

(87) PCT Pub. No.: WO2019/174675
PCT Pub. Date: Sep. 19, 2019

(65) Prior Publication Data
US 2021/0018375 A1    Jan. 21, 2021

(30) Foreign Application Priority Data

Mar. 13, 2018  (DE) .......................... 102018203809.0

(51) Int. Cl.
*G01K 7/18*     (2006.01)
*B60L 53/18*    (2019.01)
(Continued)

(52) U.S. Cl.
CPC ................ *G01K 7/18* (2013.01); *B60L 53/18* (2019.02); *H01B 7/324* (2013.01); *G01K 3/14* (2013.01); *G01K 2003/145* (2013.01); *Y02T 10/70* (2013.01); *Y02T 10/7072* (2013.01); *Y02T 90/14* (2013.01)

(58) Field of Classification Search
CPC ...... G01K 7/18; G01K 3/14; G01K 2003/145; B60L 53/18; H01B 7/324; Y02T 10/70; Y02T 10/7072; Y02T 90/14
See application file for complete search history.

(56) References Cited

U.S. PATENT DOCUMENTS 4,363,556 A * 12/1982 Belliveau ............... G01K 3/005
340/599
4,372,693 A *  2/1983 Lutz ....................... G08B 17/06
324/519

(Continued)

FOREIGN PATENT DOCUMENTS

CN       1052584 A    6/1991
CN     104198075 A   12/2014
(Continued)

*Primary Examiner* — Nathaniel T Woodward
*Assistant Examiner* — Philip L Cotey
(74) *Attorney, Agent, or Firm* — Laurence A. Greenberg; Werner H. Stemer; Ralph E. Locher

(57) ABSTRACT

A sensor line, which is configured to detect an ambient variable and which extends from a first end to a second end in a longitudinal direction, has a line core and a number of mutually spaced resistance elements with a resistance value. The resistance value varies depending on a value of the ambient variables. A measuring assembly having the sensor line is also provided.

14 Claims, 3 Drawing Sheets

(51) Int. Cl.
*H01B 7/32* (2006.01)
*G01K 3/14* (2006.01)

(56) References Cited

U.S. PATENT DOCUMENTS

| | | | | | |
|---|---|---|---|---|---|
| 4,553,432 | A | * | 11/1985 | Barlian | G01M 3/002 |
| | | | | | 374/E1.019 |
| 4,625,200 | A | * | 11/1986 | Hilborn | G08B 17/06 |
| | | | | | 374/E7.004 |
| 4,977,385 | A | * | 12/1990 | McQueen | G01F 23/246 |
| | | | | | 374/E13.006 |
| 5,134,772 | A | * | 8/1992 | McQueen | G01F 1/002 |
| | | | | | 29/613 |
| 5,221,916 | A | * | 6/1993 | McQueen | G01F 23/246 |
| | | | | | 29/613 |
| 5,541,803 | A | * | 7/1996 | Pope, Jr. | H05B 3/56 |
| | | | | | 361/103 |
| 6,152,597 | A | * | 11/2000 | Potega | H01M 10/4257 |
| | | | | | 327/512 |
| 6,210,036 | B1 | * | 4/2001 | Eberle | H01R 13/6683 |
| | | | | | 337/2 |
| 10,830,648 | B2 | * | 11/2020 | Nose | G01R 31/58 |
| 2004/0035842 | A1 | * | 2/2004 | Cheng | H05B 3/56 |
| | | | | | 219/544 |
| 2012/0076170 | A1 | * | 3/2012 | Lee | G01K 1/026 |
| | | | | | 374/E7.004 |
| 2016/0290876 | A1 | * | 10/2016 | Koeppendoerfer | G01K 7/16 |
| 2018/0188310 | A1 | * | 7/2018 | Koeppendoerfer | G01R 31/007 |
| 2019/0353530 | A1 | * | 11/2019 | Nose | G01R 31/58 |
| 2019/0353533 | A1 | * | 11/2019 | Marchesi | G01K 7/18 |
| 2020/0240848 | A1 | * | 7/2020 | Wienand | G01K 1/14 |

FOREIGN PATENT DOCUMENTS

| | | |
|---|---|---|
| CN | 104198076 A | 12/2014 |
| DE | 10341961 A1 | 4/2005 |
| DE | 102011079854 A1 | 1/2013 |
| DE | 102011084320 A1 | 4/2013 |
| DE | 102013224024 A1 | 5/2015 |
| DE | 202017105817 U1 | 11/2017 |
| EP | 0144211 A2 | 6/1985 |
| EP | 2575409 A1 | 4/2013 |

* cited by examiner

SENSOR LINE AND MEASURING ASSEMBLY

BACKGROUND OF THE INVENTION

Field of the Invention

The invention relates to a sensor line for detecting an ambient variable. The invention also relates to a measuring assembly with such a sensor line.

Detecting an ambient variable, especially detecting the temperature, is commonplace in technology, for example for monitoring machines or else for monitoring electrical cables. In some instances, special sensor cables are used for this.

In particular in the case of charging cables for electromotively driven motor vehicles, monitoring of the temperature, for example during a charging operation, is desired with regard to a number of aspects. One such aspect is for example that of controlling the maximum charging current, which heats up the charging cable, in order to ensure that the cable is "safe to touch" or in order to avoid overheating and resultant damage of the cable. In this case it is advisable in particular to provide temperature detection along the entire length of the charging cable.

It is also advisable, in particular in the area of charging cables for motor vehicles, to carry out local temperature detection, for example at predetermined points known as "hot spots", for example in order to be able to locate damage occurring.

SUMMARY OF THE INVENTION

Taking this as a departure point, the invention is based on the object of specifying a sensor line and a measuring assembly with the aid of which an ambient variable can be easily detected along a line.

The object directed to the sensor line is achieved according to the invention by means of a sensor line which is designed for detecting an ambient variable and has a line core and also a number of resistance elements spaced apart from one another in the longitudinal direction, with a respective resistance value. The resistance value varies in dependence on a value of the ambient variable.

The line core serves in the present case for example for imparting mechanical stability to the sensor line, for example as tension relief. For this, the line core preferably comprises a plastic, for example on an aramid basis, or polyethylene (PE). In particular, the line core is a (solid) strand of plastic.

Alternatively, the line core is designed as one or more electrical or optical transmission elements, which are for example surrounded by a common sheath. The line core is in this case formed for example as a sheathed line.

The sensor line extends from a first end to a second end. In this case, a respective resistance element defines a measuring portion along the sensor line. For example, the resistance elements are arranged at a predetermined distance from one another along the sensor line. In other words: the measuring portions define selected sectors along the sensor line, in which the ambient variable—in particular the change of the ambient variable—can be detected sector-dependently, so that, in dependence on a measuring portion in which the (change of the) ambient variable, in particular the temperature, is detected during operation, it is possible to infer a point/position along the sensor line at which the change of the ambient variable has occurred.

For this, a conductor is respectively made to extend along the sensor line, specifically along the line core, for each resistance element. For forming the respective resistance element, the respective conductor has a number of turns in the respective measuring portion.

The turns in the measuring portion have the effect that a specific conductor length (length of the conductor per unit of length) in the measuring portion is in particular significantly increased as compared with a portion of the conductor outside the measuring portion. Preferably, the specific conductor length in the measuring portion is greater by at least a factor of 10, preferably by a factor of 100 or a factor of 1000, than in the portions of length outside the measuring portion.

A number of turns is understood in the present case as meaning at least two turns, so that the wound design of the conductor has the effect that at least two conductor portions are adjacent to one another, that is to say extend next to one another. With preference, however, many more conductor portions are arranged next to one another, for example at least 10, at least 20, at least 50 or else at least 100. The clear distance between two conductor portions in the longitudinal direction in the region of the measuring portion preferably lies in the range of less than 5 mm and in particular in the range of less than 2 mm or else less than 1 mm. The closer the conductor portions are arranged, the higher the specific conductor length.

The higher specific conductor length has the effect that the conductor has a higher resistivity in the measuring portion than in the other regions. If the specific conductor length in the region of the measuring portion is much greater, the contribution of the other regions to the overall resistance value of the conductor can be ignored. At least a change of the resistance value as a result of a local temperature increase in the portion outside the measuring portion is negligible. By contrast, a change of the value of the ambient variable to be measured in the region of the measuring portion has a much greater effect on the overall resistance value of the conductor. This has the overall effect that only the resistance value of the resistance elements is used for detecting the ambient variable.

As a result of the multiple measuring portions arranged distributed over the sensor line in the longitudinal direction, local changes of the ambient variable can therefore be identified and located in an easy way. For the locating, the location of the respective measuring portion along the sensor line is known.

According to a first preferred configuration, the turns extend in a meandering form. Therefore, in the measuring portion the conductor is made to extend on the surface of the line core respectively between reversal points in the manner of a wavy line. The respective measuring portion, at least a respective conductor portion between two reversal points, is therefore made to extend in particular only over a partial region of the circumference of the conductor core and not around the entire circumference.

The respective conductor and the turns are preferably formed by a conductor track applied to a carrier, in particular printed on. According to a first configuration, the carrier is a sheath of the line core itself. That is to say that the conductor tracks are applied directly to the sheath. Known methods for applying conductor material are used for this, such as for example thermal spraying.

However, it is preferably a separate carrier, applied to the line core. This separate carrier is preferably a film-like carrier, for example a film or else a strip of a suitable (insulating) material. The carrier is for example fastened to the line core by adhesive bonding and for example provided parallel to the longitudinal direction. Alternatively, it is wound around the line core in the manner of a banding. The conductor track is in particular printed on by a printing process, such as is known for example from the production of printed circuit boards (films).

Expediently, a number of the conductors, with a respective measuring portion, that is to say the resistance element, are applied to a common carrier. Preferably, all of the resistance elements of the sensor line are arranged on a common carrier.

According to a second preferred configuration, the turns are formed by windings. At least in the measuring portion, the conductor is therefore wound around the line core and has there a predetermined measuring length of lay. In the region outside the measuring portion, the conductor either extends parallel to the longitudinal direction or is likewise wound around the line core, but with a greater length of lay, which is referred to hereinafter as the predetermined length of lay.

In the measuring portion, the conductor generally has a different, in particular higher, resistivity than outside the measuring portion. The predetermined length of lay merely serves in the present case for making the respective conductor extend along the sensor line. As a result of this, the value of the measuring length of lay is preferably less by a factor in the range of >10, specifically >100 or >1000 value of the predetermined length of lay. That is to say that the measuring length of lay is preferably less than the predetermined length of lay by at least a factor of 10, specifically a factor of >100 or even >1000. In the present case, the length of lay is understood as specifically meaning a distance—considered in the longitudinal direction—between adjacent windings. In other words: the respective conductor is wound "tighter" around the line core in the measuring portion than around the remaining part of the line core.

In the simplest case, the conductor is a bare (single) wire or a bare stranded wire. With preference, the conductor is an insulated wire or stranded wire.

Preferably, the ambient variable is the temperature. The advantage in this case is that it has proven to be suitable to use resistance elements for configuring the sensor line, in particular with regard to using temperature-dependent resistance elements, in order to detect the temperature or a change in temperature. As a result, a sensor line based on a simple measuring principle has been achieved.

The detection of the ambient variable is based in the present case on detecting a resistance value that is changing in dependence on the ambient variable and subsequently drawing conclusions concerning the value of the ambient variable. This configuration is based on the idea that, with a specific value of the ambient variable, a corresponding resistance value occurs. This property is used to infer the value of the ambient variable from the detected resistance values. For example, the resistance value is correlated progressively with a change of the ambient variable. That is to say that, with an increasing value of the ambient variable, the resistance value increases. Using the turns for configuring the measuring portions makes it possible to detect the ambient variable, in particular a change of the ambient variable, separately in each measuring portion.

Furthermore, configuring the resistance elements by means of conductors has the effect that the sensor line is insensitive to mechanical stresses such as for example flexures or torsions. Consequently, a reliable detection of the ambient variable is ensured even during or after mechanical stresses on the sensor line.

With preference, the resistance elements have in each case different resistance values. In particular, in the case of a finished sensor line, a respective resistance value decreases in the longitudinal direction continuously, that is to say each time by an identical resistance value. The finished sensor line is understood in the present case as specifically meaning a sensor line that has been cut to length, connected to an evaluation unit for evaluating the detected ambient variable and integrated into a component to be monitored, for example an electrical cable.

The different resistance values are preferably achieved by the resistance elements having in each case a different number of turns. That is to say that the number of windings of a resistance element is correlated proportionally to the associated resistance value. In the aforementioned example, this means that, with a decreasing resistance value, the respective resistance elements likewise have a decreasing number of turns.

Alternatively, the resistance value of a respective resistance element increases continuously from the first end to the second end.

The advantage of this configuration is that the individual resistance elements have a characteristic resistance value at a constant temperature. Consequently, at a constant temperature, each resistance element is therefore identifiable. This also facilitates an assignment of the individual measuring portions along the sensor line.

In order to achieve an identical length of the resistance elements, and consequently of the measuring portions, in an expedient development the resistance elements have in each case different distances between the individual longitudinally adjacent portions of the turns or conductors. In the case of windings, the resistance elements therefore have different measuring lengths of lay. For example, the distance between the adjacent portions of the turns of the resistance elements increases as the resistance value becomes smaller. That is to say that a smaller number of turns per resistance element (for forming the different resistance values) is compensated by an increase in the respective distance, that is to say for example by an increase in the respective measuring length of lay, so that the resistance elements will have an equal geometrical length to one another. This also achieves the effect of an easier and more uniform subdivision of the sensor line into the individual measuring portions.

According to an expedient configuration, a respective measuring portion has a length with a value >1 cm, in particular >5 cm and for example in the range between 5 cm and 10 cm. This has the effect that in the respective measuring portion there is formed a resistance element with a resistance value that advantageously influences the sensitivity and/or accuracy of the detection of the ambient variable. This configuration is based on the idea of exposing a greater length of the conductor, and consequently "more" of the in the present case temperature-dependent material within the measuring portion to the ambient variable, in the present case the temperature, and consequently achieving a more accurate detection thereof. At the same time, the limitation of the length allows a spatially resolved detection of the ambient variable. In principle—depending on the application—much longer measuring portions, for example of several 10 cm, for example in the range of 20 cm to 100 cm, can also be realized.

According to a preferred configuration, the conductors, especially in the configuration with the windings, are formed as enameled wires. Enameled wire has proven to be advantageous for forming the resistance elements, in particular with regard to its material and geometrical properties.

Also with preference, the enameled wires have a diameter with a value in the range from 0.04 mm to 0.06 mm. This has the effect that a sensor line with a small diameter is achieved. The possibilities for using the sensor line are increased as a result. Also, such enameled wires can be wound very tightly around the line core.

Preferably—irrespective of the respective configuration as a winding or turn of a meandering form—the resistance elements comprise a material with a temperature coefficient with a value $>3.5$ $K^{-1}$, specifically $>5$ $K^{-1}$. Such materials are for example copper or steel. The specified values of the temperature coefficient are figures obtained under preferably standardised conditions, that is to say for example 20° C. With preference, the temperature coefficient is additionally linear in a desired temperature range, for example between 40° C. and 100° C., which has an advantageous effect on the change of the resistance value when there is a change of the temperature. The temperature coefficient is understood in the present case as meaning generally a coefficient that describes a relative change of a physical variable—in the present case the electrical resistance—when there is a change of the temperature with respect to a predetermined reference temperature.

According to an expedient configuration, a finished state of the sensor line the resistance elements are electrically connected to one another at the first end. In other words: the respective conductors, forming the individual resistance elements, are short-circuited at the first end of the finished sensor line. The advantage of this configuration can be seen in the easy evaluation of the detection of the ambient variable. For this, the sensor line can for example be connected by the second end to an evaluation unit by which a resistance value of a loop that forms due to the short-circuit at the first end is detected, in particular is measured, during operation.

In an expedient development, additionally arranged along the line core is a return conductor. This return conductor is for example also provided on the common carrier or wound around the line core. It is also preferred that the return conductor is electrically connected at the first end to the resistance elements connected to one another.

The advantage of this development is that the individual resistance elements can in this case be measured separately and individually to determine the resistance values, and consequently the value of the ambient variable. In this case, to form the loop, the evaluation unit is for example merely connected at the second end by one terminal to the return conductor and by a second terminal alternately to the respective conductor to be measured. With a predetermined electrical current injected into the loop, a voltage drop occurring across the resistance element formed by the conductor allows the resistance value of the resistance element to be inferred.

According to an expedient configuration, the line core and the resistance elements are jointly surrounded by a preferably transparent protective sheath. This has the effect in particular that the resistance elements formed by the conductors are protected from mechanical influences, such as for example friction or impact. The transparency of the protective sheath allows the individual measuring portions to be located.

In a preferred configuration, the sensor line is integrated in an electrical cable to be monitored. In this case, the sensor line is for example integrated in a cable structure together with further line elements, for example supply wires, and for example surrounded together with the further line elements by a common protective sheath. Alternatively or additionally, the line core of the sensor line is formed as the electrical cable. The measuring portions of the sensor line formed by the conductors therefore in this case surround the cable to be monitored. The sensor line also preferably extends along the entire length of the cable to be monitored.

According to a preferred development, the cable to be monitored is designed as a charging cable, in particular as a charging cable for an electromotively driven motor vehicle. In this case, a charging cable is understood as meaning in particular a cable that serves for charging a rechargeable battery of the electromotively driven motor vehicle—supplying power to the electrical drive motors. For this, the charging cable is preferably designed for carrying electrical currents with values of greater than 10 A and generally also greater than 100 A and usually has—for connecting to the motor vehicle—a standardized charging connector, for example a type 1 connector or a type 2 connector.

As already mentioned at the beginning, as a result of the arrangement of the measuring portions along the sensor line, the integration of the sensor line in such a charging cable has the effect in particular of achieving a detection of "hot spots" along the charging cable.

The object directed to the measuring assembly is achieved according to the invention by a measuring assembly for detecting an ambient variable, with the previously described sensor line and also an evaluation unit, to which the respective resistance elements of the sensor line are connected. The evaluation unit is also designed for detecting and evaluating the resistance value of the resistance elements.

According to a preferred configuration of the evaluation unit, as already stated in the description of the sensor line, the resistance elements are electrically connected to one another at the first end of the sensor line.

With preference, the measuring assembly is designed for assigning the respective measuring portions to a region of the sensor line. In other words: the measuring assembly is designed for assigning the individual measuring portions to their position along the sensor line, so that a detection of the ambient variable that is in particular spatially resolved is made possible.

For detecting and evaluating the resistance values of the resistance elements, and consequently the value of the ambient variable, the evaluation unit has in the present case suitable components. For example, a voltage divider circuit by which the individual resistance values can be easily detected is realized by means of these components. Alternatively, the resistance values are determined with the aid of a Wheatstone measuring bridge. In principle, the detection of a resistance value and methods for this are known, for which reason they are not discussed any further in this application. In principle, all known methods for detecting resistance values can be realized by means of the evaluation unit.

Various methods are appropriate for producing the sensor line—depending on the configuration.

In the case of the configuration with a carrier, the latter is provided in the manner of a banding around the line core like a conventional banding. Alternatively, the carrier is connected to the line core cohesively, for example by adhesive bonding.

In the case of the configuration with the windings or else with the banded carrier, for example multiple winding devices loaded with the conductors and arranged laterally in relation to a direction of production are arranged one behind the other in the direction of production, for example in the manner of a tangential banding machine. The line core is made to extend through the winding devices. In this case, the winding devices rotate about the line core.

In the case of the windings, the conductors are wound around the line core with the predetermined length of lay. In order to form the resistance elements, for example the rotational speed of the winding devices is increased at respectively predetermined points, and consequently the length of lay of the respective conductor is shortened. In the case of the windings, a winding device is preferably provided for each measuring portion. In other words: at the point of the sensor line at which at least one measuring portion is to be formed, the rotational speed of at least one winding device is increased, so that the length of lay shortened as a result forms the at least one measuring portion. With preference, the method for producing the sensor line is performed in the manner of an endless process. In this case, the sensor line is for example first rolled up onto a line drum in the unfinished state, that is to say without a predetermined length.

With preference, in the method, a defined number of different resistance elements are formed in a periodically recurring manner. In this case, the resistance values of the resistance elements either decrease continuously or increase continuously in the longitudinal direction. For producing a finished sensor line, a predetermined length of the unfinished sensor line is cut to length, the finished sensor line having a number of resistance elements that is less than the defined number of resistance elements. In other words: if in the uncut-to-length form, the unfinished sensor line has for example eleven different resistance elements that periodically recur, a sensor line cut to length from this unfinished sensor line has a maximum of ten resistance elements. A sensor line with ten resistance elements is at the same time the "longest possible" sensor line that can be produced from an unfinished sensor line with eleven resistance elements.

In order to make possible a clear assignment of the individual resistance elements along the sensor line in the course of the finishing of the sensor line, preferably a so-called zero measurement is carried out. In this case, as already described above, the sensor line in the unfinished state preferably has more resistance elements, and consequently more measuring portions, than are required in the finished state. If for example for one application ten measuring portions are required along the length of the finished sensor line, preferably at least eleven measuring portions are arranged on the line core in the course of the production of the unfinished sensor line. This has the consequence that, after the cutting to length of the sensor line, one of the eleven measuring portions, and consequently a resistance value, does not exist during a measurement of the individual measuring portions of the cut-to-length sensor line. Provided that the finishing of the sensor line is performed at the correct end, the resistance value following the missing resistance value can be regarded as the first resistance value, and consequently as the first measuring region, of the sensor line. In other words: the gap, that is to say the missing measuring portion, "marks" the separating point.

The previously mentioned zero measurement is carried out for example in the course of the finishing of the sensor line, before it is used for the first time. At the first end, the individual conductors are short-circuited and at the second end they are for example connected to a test circuit, which measures the individual resistance elements formed by the conductors and establishes the positions of the measuring regions on the basis of the measurement. The zero measurement may alternatively or additionally also be carried out by the evaluation unit. In this case it must be ensured in particular that the sensor line is exposed to a constant temperature during the zero measurement in order to avoid falsification of the zero measurement.

The advantages and preferred configurations presented with regard to the sensor line can be transferred analogously to the measuring assembly, and vice versa.

Exemplary embodiments of the invention are explained more specifically below on the basis of the figures, which are partly shown in greatly simplified representations.

DETAILED DESCRIPTION OF THE INVENTION

In the figures, parts that have the same effect are shown with the same designations.

Figure 1:
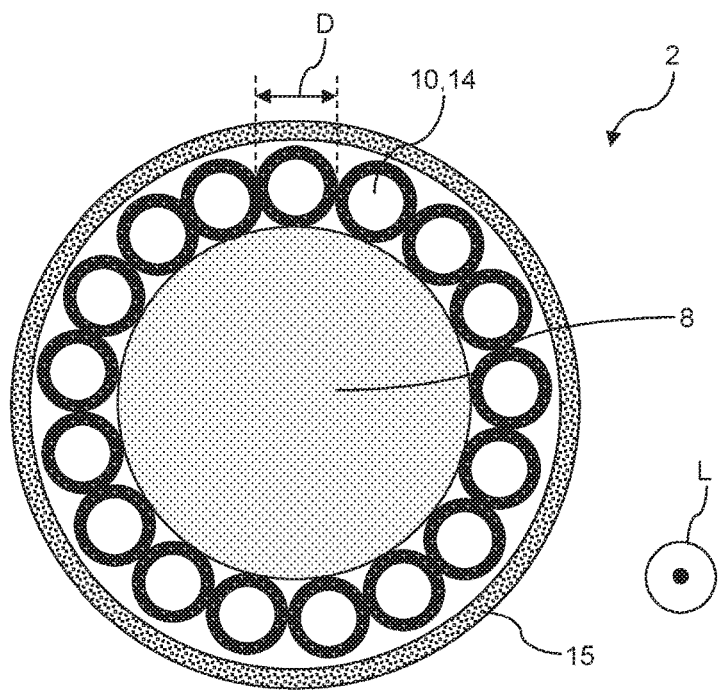
FIG. 1 shows a cross-sectional representation of a sensor line.

The sensor line 2 shown in FIG. 1 in a sketched cross-sectional representation extends in a longitudinal direction L from a first end 4 (cf. FIG. 2) to a second end 6 (cf. FIG. 2) and is designed for detecting an ambient variable, in the exemplary embodiment the temperature.

The sensor line 2 also has a line core 8. In the exemplary embodiment, the line core 8 comprises a strand of plastic on an aramid basis and is in particular formed from such a strand of plastic. The line core 8 serves for mechanically stabilizing the sensor line 2.

Figure 2:
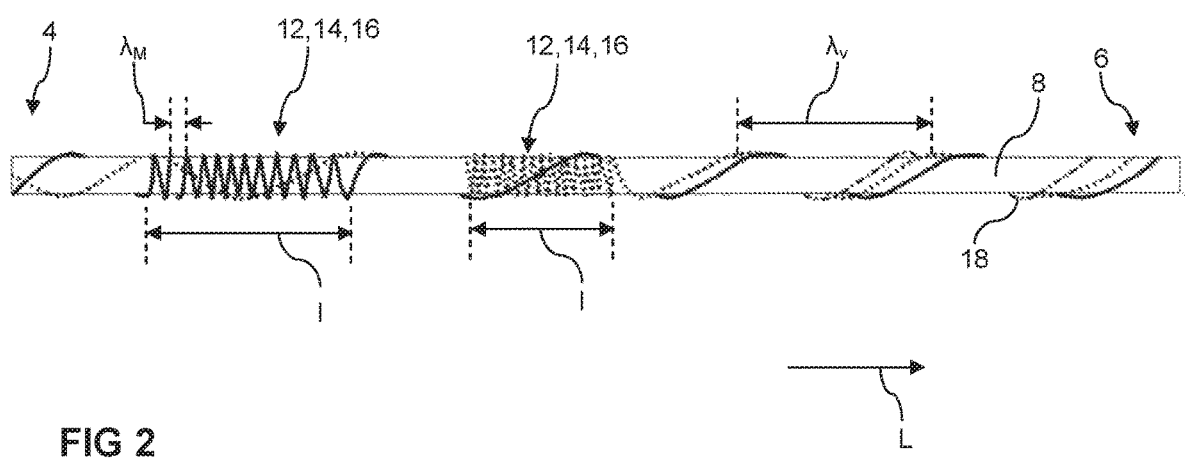
FIG. 2 shows a side view of the finished sensor line with two measuring portions.

The sensor line 2 also has a number (>2), in the exemplary embodiment according to FIG. 1 seventeen, of resistance elements 10 spaced apart from one another in the longitudinal direction L (FIG. 2). The resistance elements 10 have in each case a resistance value that varies in dependence on a value of the ambient variable. Each resistance element 10 defines a measuring portion 12 (cf. FIG. 2).

For forming the resistance elements 10, for each resistance element 10 a conductor 14 is respectively made to extend along the line core 8, the conductor 14 having multiple turns 16 in the region of the measuring portion 12. In the exemplary embodiments of FIG. 1 and FIG. 2, the turns 16 are formed as windings, in the case of which the conductor 14 is wound around the line core 8.

Figure 3:
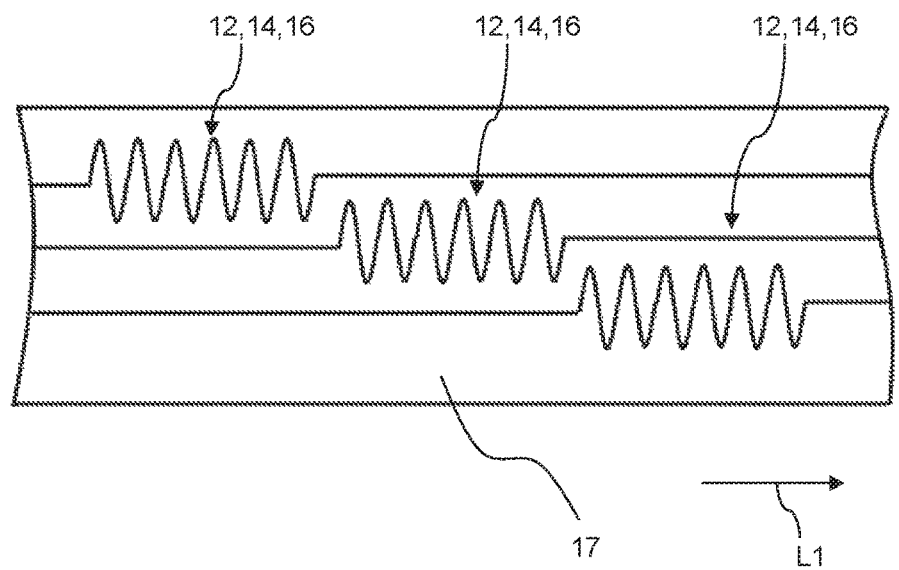
FIG. 3 shows a representation of a detail of a carrier with conductors and resistance elements provided on it.

In an alternative configuration, the turns 16 are formed as turns 16 of a meandering form, which are in particular formed as conductor tracks provided on a carrier 17, as shown in FIG. 3.

In the case of this alternative configuration, the carrier 17 is preferably provided around the line core 8, in particular in the manner of a banding.

In the exemplary embodiment according to FIG. 1 and FIG. 2, the resistance elements 10 are formed in each case by a conductor 14, for example an enameled wire, which is arranged circumferentially around the line core 8 (cf. FIG. 2). In FIG. 1, only one end of a respective conductor 14 can in this case be seen. The conductors 14 have in the exemplary embodiment a diameter D with a value in the range from 0.04 mm to 0.06 mm.

This also has the effect that a very thin sensor line 2 can be realized. Very thin is understood in the present case as meaning a diameter of the sensor line 2 with a value in the range between 1 mm and 5 mm.

In the exemplary embodiment, the line core 8 and the resistance element 10 are jointly surrounded by a protective sheath 15 for mechanical protection of the sensor line 2. The protective sheath 15 is preferably also formed in the case of the alternative configuration with the carrier 17.

Irrespective of the variant of the embodiment—the conductors 14 have a temperature-dependent electrical resistance, as a result of which they are used for detecting the ambient variable, in particular the temperature, easily and with little effort. In the exemplary embodiment, the conductors 14 comprise for example copper or steel, and in particular are formed from copper or steel.

The side view shown in FIG. 2 of the finished sensor line 2 serves for a detailed understanding of the formation of the resistance elements 10 by means of in each case a conductor 14.

For each resistance element 10, a conductor 14 is respectively made to extend along the sensor line 2, that is to say along the longitudinal direction L. In the case of the configuration with the wound conductors 14, the conductor is wound around the line core 8 in particular with a predetermined length of lay $\lambda_v$. For forming the respective resistance element 10, in the respective measuring portion 12 the conductor 14 is wound with a measuring length of lay $\lambda_M$ around the line core 8 with multiple turns 16 formed as windings. That is to say that, for forming the resistance element 10, the respective conductor 14 is wound "tighter" around the line core 8 in the measuring portion 12 than around the remaining part of the line core 8. In FIG. 2, this is shown by way of example by two spaced-apart measuring portions 12.

Generally, the turns 16—whether wound or made to extend in a meandering form—have the effect that a specific conductor length, and consequently a resistivity (resistance per unit length of the sensor line 2), is increased, in particular significantly, in the measuring portion 12 in comparison with portions of the conductor 14 outside the measuring portion 12.

This configuration makes it possible to detect the ambient variable, and in particular a change of the ambient variable, within the measuring portions 12. That is to say that, if the ambient variable, in the present case the temperature, in the region of the measuring portions 12 changes, the resistance value of the resistance elements 10 formed by the conductors 14 changes. The changing resistance value can be detected and taken as a basis for concluding the (changed) ambient variable.

Each measuring portion 12 has a length l with a value >1 cm, in particular >2 cm and specifically in the range between 2 cm and 5 cm. The length l together with the high specific conductor length formed by the turns 16 in the measuring portion 12 achieves an accurate and sensitive detection of the ambient variable within the measuring portions 12, since there is "more" material within the measuring portions 12 that is influenced by the ambient variable.

A return conductor 18, which is only shown in the region of the second end 6, is additionally arranged. The return conductor 18 likewise extends along the line core 8. In the case of the configuration with the turns 16 formed as windings, the return conductor is wound around the line core 8 in a way analogous to the conductors 14, but for example only with the predetermined length of lay $\lambda v$. The return conductor 18 generally does not form a resistance element 10.

In the case of the variant shown in FIG. 3, multiple conductors 14, in particular in the manner of conductor tracks, are applied to the carrier 17, in particular printed on. The carrier 17 is a film-like carrier 17. Outside the measuring portions 12, the individual conductors 17 extend in a straight line and in particular parallel to a longitudinal direction L1 of the carrier 17. In the region of the measuring portions 12, the respective conductor track extends in a meandering or wave-like form with a multiplicity of individual turns 16. A turn 16 is understood in this case as meaning the region of a reversal in the direction of the course of the conductor track. In the exemplary embodiment, 12 turns are respectively shown for each resistance element 10/measuring portion 12. The measuring portions 12 preferably have the aforementioned lengths l.

Preferably, all of the resistance elements 10 of the sensor line 2 are arranged on the common carrier 17. The return conductor 18, which in particular extends in a straight line, is preferably also additionally applied to this carrier.

The carrier 17 is preferably wound around the line core 8 in the manner of a banding.

Figure 4:
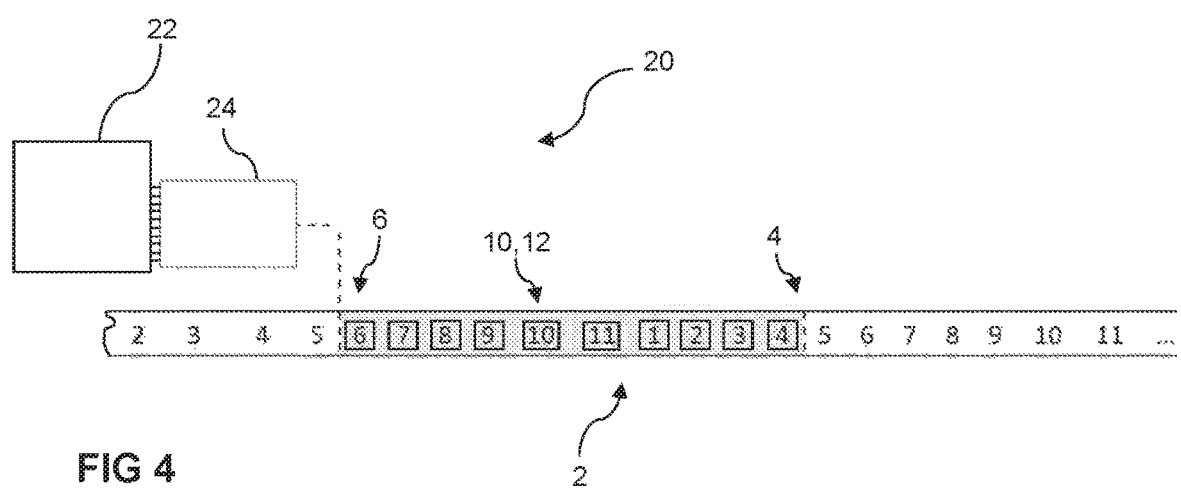
FIG. 4 shows a schematic block diagram of a sensor line to be made up and FIG. 5 shows a schematic representation of a motor vehicle connected to a charging station by means of a charging cable for charging.

In FIG. 4, a schematic representation of a sensor line 2 to be made up is shown. For making up the sensor line 2, it is cut to length at the first end 4 and the second end 6 from an un-made-up "continuous production". "Continuous production" is understood in the present case as meaning that the sensor line 2 is produced in the manner of an endless process in such a way that it has a defined number (according to FIG. 4 eleven) of resistance elements 10 periodically recurring, with a respective defined resistance value. In the exemplary embodiment, the eleven resistance elements 10 are schematically represented by the numbers respectively surrounded by a border.

The resistance elements 10 formed by conductors 14 are subsequently electrically connected to one another at the first end 4 of the sensor line 2. At the second end 6 of the sensor line 2, the individual conductors 14 are led into a connector 24. Being made up in this way allows a connectability of the sensor line 2 for example to an evaluation unit 22, which in the present case determines the individual resistance elements 10 and assigns them to their position along the sensor line before the sensor line 2 is used for the first time, for example after the already described process of zero measurement.

In the exemplary embodiment according to FIG. 4, this means that after the cutting to length in the case of the sensor line 2 the resistance value of the resistance element 10 with the number 5 is missing. In the case of a decreasing resistance value between successive resistance elements 10, the resistance element 10 with the number 6 consequently has the next-lower resistance value. According to the principle of zero measurement, the evaluation unit 22 consequently "knows" that the resistance element 10 with the number 6 is the first resistance element 10 of the sensor line 2 (considered from the connector side). On the basis of this information, it is made possible, for example for the evaluation unit 22, to assign the individual resistance elements 10, and consequently the individual measuring portions 12, locationally along the sensor line 2. This has the effect in particular that a spatially resolved detection of the ambient variable, that is to say a temperature detection, is made possible. The advantage of this configuration is that a detection of "hot spots" is realized in an easy way.

Figure 5:
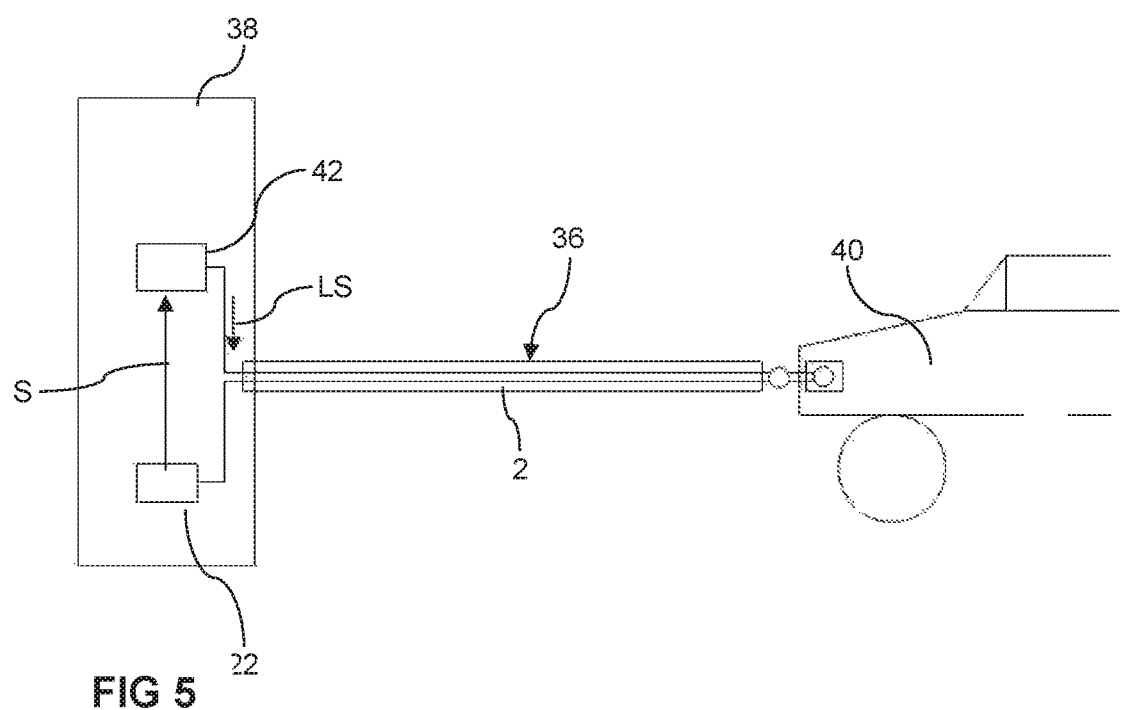

FIG. 5 shows a schematic representation of a cable 36, designed as a charging cable, for the charging of a motor vehicle 40 connected to a charging station 38. The motor vehicle 40 is an electromotively driven motor vehicle 40.

In the exemplary embodiment according to FIG. 5, the sensor line 2 is integrated in the cable 36. That is to say that the sensor line 2 is arranged along with a number of supply lines that are not shown (which carry the charging current LS) in the charging cable and is surrounded for example together with the supply lines by a common outer sheath. Alternatively, the line core 8 has the supply lines, so that the charging cable and the sensor line are formed as a single cable 36.

In the exemplary embodiment, the evaluation unit 22 is integrated in the charging station 36 and is designed for communication with a control unit 42 controlling the charging current LS.

The sensor line 2 serves for monitoring the temperature within the cable 36 during the charging operation. If the temperature in the cable 36 attributable to the flowing charging current LS for example exceeds a predetermined value, this is detected by the evaluation unit 22 and communicated to the control unit 42, for example in the form of a signal S. In response, the control unit 42 reduces the value of the charging current LS or stops the charging operation completely. This has the effect of preventing thermal overheating and consequently damage of the cable 36.

The invention is not restricted to the exemplary embodiments described above. Rather, other variants of the invention can also be deduced by a person skilled in the art without departing from the subject matter of the invention. In particular, furthermore, all of the individual features described in connection with the exemplary embodiments can also be combined with one another in some other way without departing from the subject matter of the invention.

The invention claimed is:

1. A sensor line, for detecting an ambient variable, the sensor line comprising:
    a first end and a second end defining a longitudinal direction;
    a line core;
    a plurality of resistance elements spaced apart from one another in the longitudinal direction, said resistance elements each having a respective resistance value varying in dependence on a value of the ambient variable;
    each of said resistance elements defining a respective measuring portion;
    conductors each extending along said line core for a respective one of said resistance elements, said conductors each having a plurality of turns in a respective measuring portion for forming a respective resistance element;
    each of said conductors having a higher resistivity in said measuring portion than outside said measuring portion; and
    said turns in said measuring portion causing a specific conductor length, being a length of said conductor per unit of length, in said measuring portion to be increased as compared with a portion of said conductor outside said measuring portion.

2. The sensor line according to claim 1, wherein said turns are formed in a meandering shape.

3. The sensor line according to claim 1, wherein said turns are formed as windings wound around said line core.

4. The sensor line according to claim 1, which further comprises a carrier, each of said conductors and said turns being formed by a respective conductor track applied to said carrier.

5. The sensor line according to claim 4, wherein said carrier is applied to said line core.

6. The sensor line according to claim 4, wherein a plurality of said conductors with said resistance elements are applied together to said carrier.

7. The sensor line according to claim 1, wherein said conductors are enameled wires.

8. The sensor line according to claim 1, wherein said resistance elements are electrically short-circuited to one another at said first end in a finished state of the sensor line.

9. The sensor line according to claim 8, which further comprises a return conductor disposed along said line core and electrically connected at said first end to said resistance elements being connected to one another, in the finished state of the sensor line.

10. The sensor line according to claim 1, which further comprises a protective sheath jointly surrounding said line core and said resistance elements.

11. The sensor line according to claim 1, wherein the sensor line is configured to be integrated in a cable to be monitored.

12. The sensor line according to claim 11, wherein the cable to be monitored is a charging cable or a motor vehicle charging cable.

13. A measuring assembly for detecting an ambient variable, the measuring assembly comprising:
    a sensor line extending in a longitudinal direction from a first end to a second end, said sensor line configured for detecting the ambient variable and said sensor line including:
    a line core,
    a plurality of resistance elements spaced apart from one another in the longitudinal direction, said resistance elements each having a respective resistance value varying in dependence on a value of the ambient variable,
        each of said resistance elements defining a respective measuring portion, and
        conductors each extending along said line core for a respective one of said resistance elements, said conductors each having a plurality of turns in a respective measuring portion for forming a respective resistance element;
        each of said conductors having a higher resistivity in said measuring portion than outside said measuring portion;
        said turns in said measuring portion causing a specific conductor length, being a length of said conductor per unit of length, in said measuring portion to be increased as compared with a portion of said conductor outside said measuring portion; and
    an evaluation unit configured for detecting and evaluating the resistance value of said resistance elements, said evaluation unit being connected to said resistance elements.

14. The measuring assembly according to claim 13, wherein the measuring assembly is configured for assigning each of said measuring portions to a respective region of said sensor line.

* * * * *